US010389445B2

(12) United States Patent
Hong et al.

(10) Patent No.: US 10,389,445 B2
(45) Date of Patent: Aug. 20, 2019

(54) VISIBLE LIGHT RECEIVER AND VISIBLE LIGHT COMMUNICATION SYSTEM COMPRISING A VISIBLE LIGHT RECEIVER

(71) Applicant: LG ELECTRONICS INC., Seoul (KR)

(72) Inventors: Jaepyo Hong, Seoul (KR); Hee Gu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/038,883

(22) Filed: Jul. 18, 2018

(65) Prior Publication Data

US 2019/0036605 A1 Jan. 31, 2019

(30) Foreign Application Priority Data

Jul. 27, 2017 (KR) .......................... 10-2017-0095408

(51) Int. Cl.
H04B 10/116 (2013.01)
H04B 10/60 (2013.01)
H04B 10/114 (2013.01)
H04B 10/50 (2013.01)
H04B 10/40 (2013.01)

(52) U.S. Cl.
CPC ....... H04B 10/116 (2013.01); H04B 10/1141 (2013.01); H04B 10/60 (2013.01); H04B 10/1149 (2013.01); H04B 10/40 (2013.01); H04B 10/50 (2013.01)

(58) Field of Classification Search
None
See application file for complete search history.

(56) References Cited

U.S. PATENT DOCUMENTS

| 5,495,676 A * | 3/1996 | Chesnut ................. F41G 1/383 |
| | | 359/511 |
| 5,555,324 A * | 9/1996 | Waxman .................. G06T 5/20 |
| | | 348/E5.09 |
| 2003/0036356 A1* | 2/2003 | Witehira ................ H04B 10/11 |
| | | 455/41.1 |
| 2008/0102657 A1* | 5/2008 | Lang ...................... H01R 23/68 |
| | | 439/78 |

* cited by examiner

Primary Examiner — Darren E Wolf
(74) Attorney, Agent, or Firm — Ked & Associates LLP

(57) ABSTRACT

A visible-light receiver and a visible-light communication system including the visible-light receiver may improve an accuracy of light reception. The visible-light receiver may include a housing having a first opening defined on a top face thereof; a lens module provided inside the housing that receives light or a visible-light signal and converts the light into an electric or electrical signal, wherein the light may be emitted from a visible-light emitter and passes through the first opening and to the lens module; a data processing module or data processor assembly provided within the housing that receives the electric signal from the lens module and converts the electric signal into data; and a cap or hollow tube provided on a top face of the housing so as to extend around the first opening and protrude upwardly, wherein the cap may have second and third openings defined in lower and upper portions thereof, respectively.

20 Claims, 11 Drawing Sheets

VISIBLE LIGHT RECEIVER AND VISIBLE LIGHT COMMUNICATION SYSTEM COMPRISING A VISIBLE LIGHT RECEIVER

CROSS-REFERENCE TO RELATED APPLICATION(S)

This application claims priority under 35 U.S.C. 119 and 35 U.S.C. 365 to Korean Patent Application No. 10-2017-0095408 filed on Jul. 27, 2017 in Korea, the disclosure of which is hereby incorporated by reference in its entirety.

BACKGROUND

1. Field

A visible-light receiver and a visible-light communication system including a visible-light receiver is disclosed herein.

2. Background

Visual-light or visible-light communication (VLC) technology may transmit information using visible-light, or electromagnetic radiation in the visible light spectrum. For example, information may be transmitted by turning on and/or off visible light from a fluorescent lamp or a light emitting diode (LED).

This visible-light communication technology may be advantageous in that the information may not be leaked outdoors when the light is blocked, and, thus, information may be secure, and further, there is little to no risk of electromagnetic interference.

Since a widespread use of illumination units, lighting devices, or illuminating devices using semiconductor light-emitting elements such as light emitting diodes (LEDs) is rapidly growing, research on visible-light communication technology using LEDs among visible-light communication technologies is being actively conducted. Since the visible-light communication technology communicates data using light as a medium, an accuracy of a receiver for a visible-light communication, that is, the visible-light receiver, may be affected by the light emitted from a fluorescent lamp or an indoor illumination unit or illuminating device such as a TV.

In particular, when a plurality of illumination units emits light or visible-light signals simultaneously toward a single visible-light receiver, there may be a problem in that the plurality of light rays or visible-light signals may act as noise to each other. Accordingly, when the plurality of illumination units is concentrated in one space, there may be a problem in that the visible-light signal reception of the visible-light receiver may be less accurate.

BRIEF DESCRIPTION OF THE DRAWINGS

Embodiments will be described in detail with reference to the following drawings in which like reference numerals refer to like elements, and wherein.

DETAILED DESCRIPTION

Figure 1:
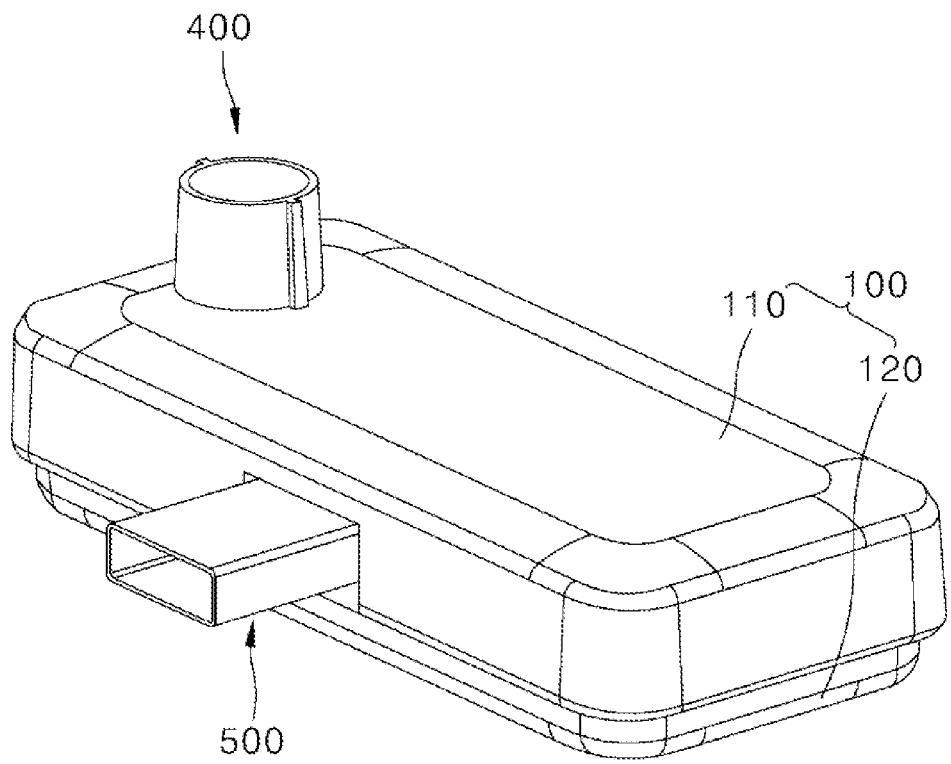
FIG. 1 is a perspective view illustrating a visible-light receiver according to an embodiment.
Figure 2:
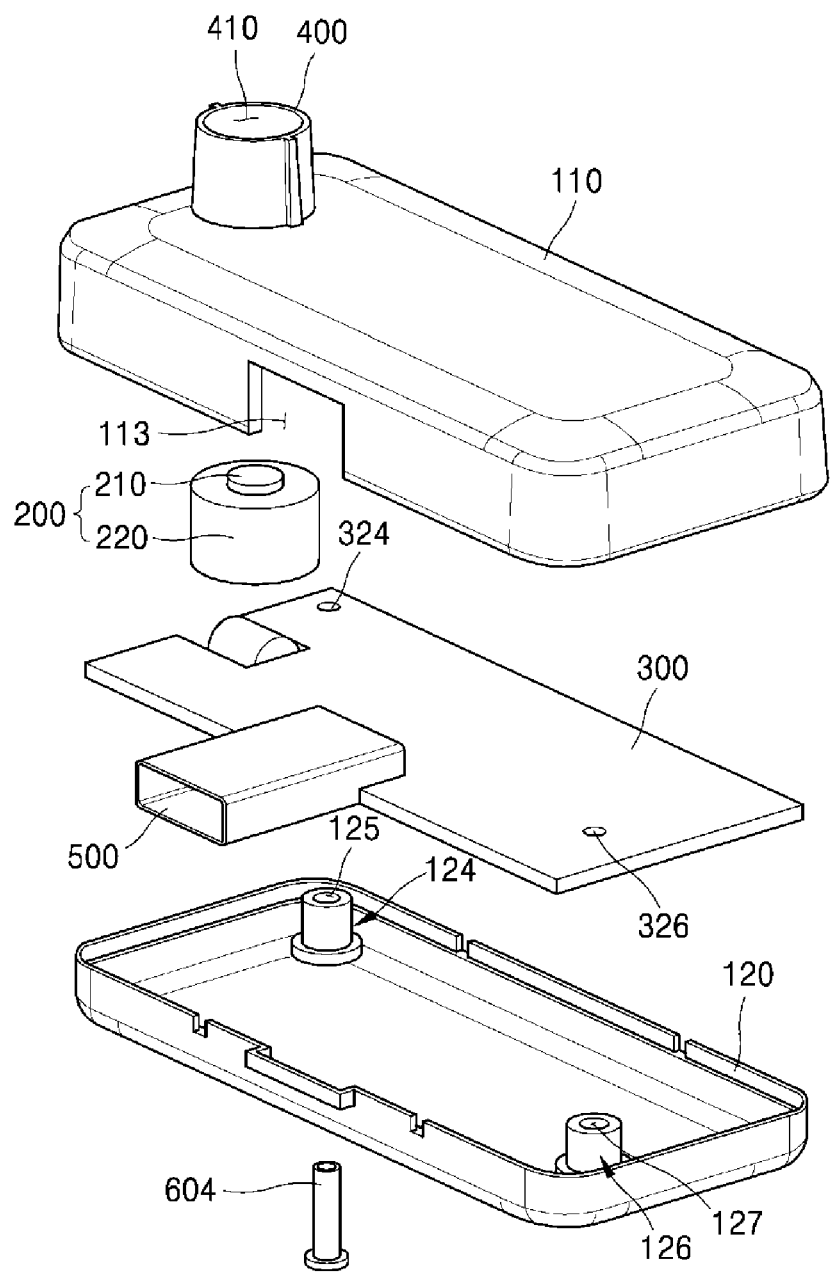
FIG. 2 is an exploded perspective view of the visible-light receiver of FIG. 1.
Figure 3:
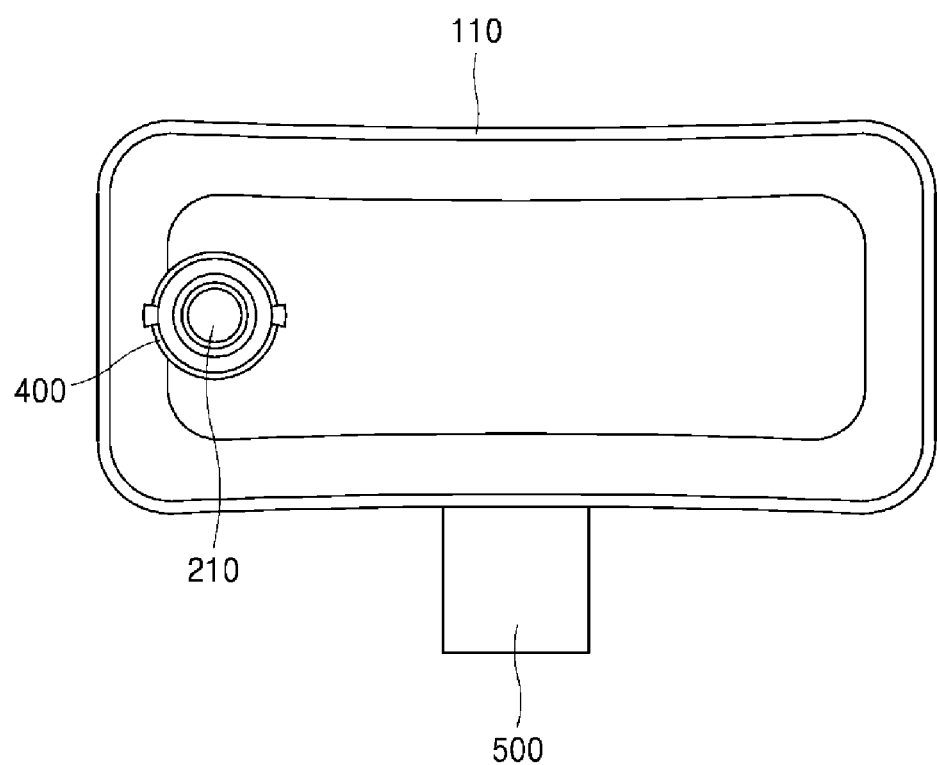
FIG. 3 is a top view of the visible-light receiver in FIG. 1.
Figure 4:
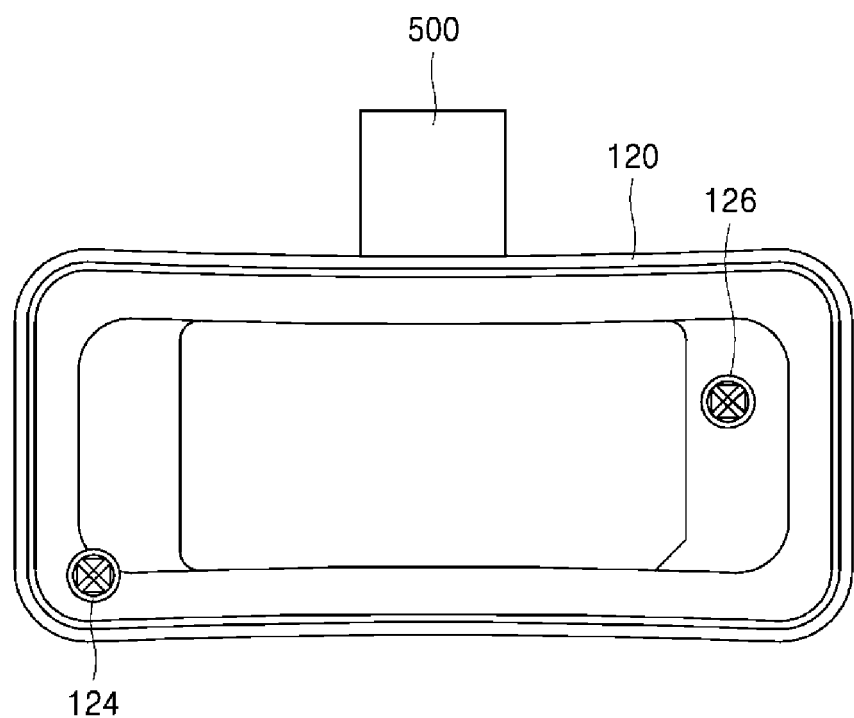
FIG. 4 is a bottom view of the visible-light receiver of FIG. 1.
Figure 5:
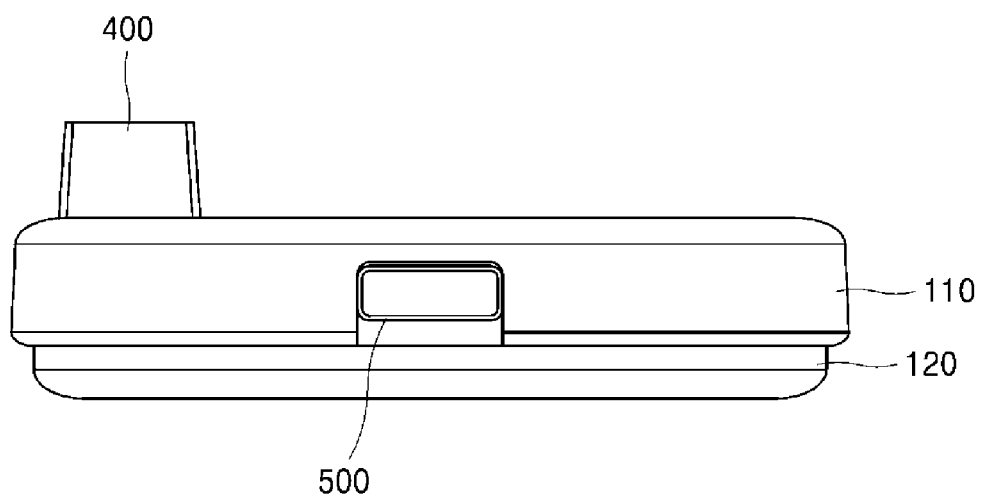
FIG. 5 is a front view of the visible-light receiver of FIG. 1.
Figure 6:
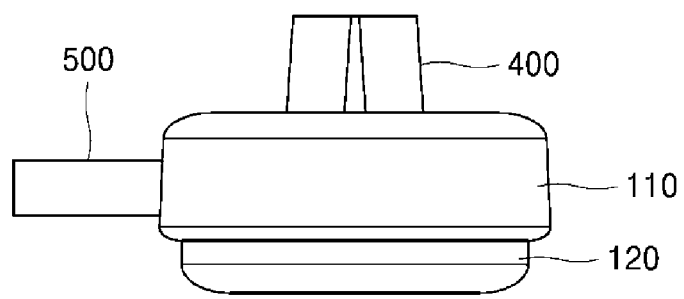
FIG. 6 is a side view of the visible-light receiver in FIG. 1.

A visible-light receiver according to an embodiment of the present disclosure will be described with reference to FIGS. 1 to 8. A visible-light receiver 1 according to an embodiment may include a housing 100, a lens module 200, a data processing module or data processor assembly 300, a cap or hollow tube 400, and an input and output module or input/output module 500. The housing 100 may have a first opening 112 defined within a top face or a first surface of the housing 100. The data processing module 300 and the lens module 200 may be provided inside the housing 100.

The housing 100 may include an upper housing or first housing 110 and a lower housing or second housing 120. A first opening 112 may be defined in a top face or a first surface of the upper housing 110, and a through-hole 113 may be defined in a lateral face or a second surface of the upper housing 110.

The cap 400 may be provided on the first opening 112 defined in the top face of the upper housing 110. That is, the cap 400 may be provided on the top face of the upper housing 110 so as to protrude upwardly from the first opening 112.

In the first opening 112, an optical lens 210 of the lens module 200 may be provided. Thus, light emitted from an external visible-light emitter 1000 may be incident on the optical lens 210 in the first opening 112. The light may be electromagnetic radiation and may include a light ray, a light beam, or a visible-light signal. The light or visible-light signal may include electromagnetic radiation having a wavelength in the visible light spectrum.

The lower housing 120 may be coupled to the upper housing 110. In the lower housing 120, the data processing module 300 and the lens module 200 may be mounted. Further, first and second bosses 124 and 126 protruding upward from an inner bottom face of the lower housing 120 may be provided.

The first boss 124 may protrude upward from a first corner of the inner bottom face of the lower housing 120. Further, the first boss 124 may have a first boss hole 125 passing therethrough in a longitudinal direction thereof, i.e., in the vertical direction. The second boss 126 may protrude upward from a second corner of the inner bottom face of the lower housing 120. The first corner may be diagonally opposite to the second corner. Further, the second boss 126 may have a second boss hole 127 passing therethrough in a longitudinal direction thereof, i.e., in the vertical direction.

First and second fasteners 604 and 606 (e.g., screws) may be inserted into the first and second boss holes 125 and 127, respectively. The first and second fasteners 604 and 606 may be inserted into the first and second boss holes 125 and 127 respectively and combined with the data processing module 300, which may be mounted on the first and second bosses 124 and 126. Accordingly, the data processing module 300 may be fixed to the lower housing 120.

In an embodiment, the housing 100 may be constructed as an integral body. However, for convenience of illustration, the housing 100 may include the upper housing 110 and the lower housing 120, as an example.

The lens module 200 may be provided inside the housing 100 and may receive a visible-light signal emitted through the first opening 112 from the visible-light emitter 1000, and convert the received visible-light signal into an electric signal or an electrical signal. The lens module 200 may be provided on a top face or a first surface of the data processing module 300 and may provide the electric signal to the data processing module 300.

The lens module 200 may include the optical lens 210 and a lens housing 220. The optical lens 210 may be provided on a top surface or a first surface of the lens housing 220 and may collect the light or the visible-light signal emitted from the visible-light emitter 1000 through the first opening 112. The optical lens 210 may focus the light or the visible-light signal. Further, the lens housing 220 may be provided with a photo-electric conversion module or photoelectric converter 225 that converts the collected visible-light signal into an electric signal or electrical signal (that is, a modulated signal).

The photo-electric conversion module 225 may include, for example, at least one or more photodiodes, and the at least one or more photodiodes may have different spectral characteristics or properties. In an embodiment, the lens housing 220 may further include an optical filter.

The optical filter may be provided at a front end of the photo-electric conversion module 225 to transmit only the visible-light signal of a specific wavelength region or range from the visible-light signal provided from the optical lens 210 to the photo-electric conversion module 225. That is, light passing through the first opening 112 may be filtered through the optical filter such that the light that exits the optical filter and propagates toward the photo-electric conversion module 225 has a specific wavelength, or has a wavelength in a specific wavelength range. The optical filter may filter the light propagating from the first opening 112 such that only light in the visible spectrum of electromagnetic radiation exits the optical filter and propagates toward the photo-electric conversion module 225. There may be more than one optical filter. The visible-light signals of the specific wavelength region, or the filtered light, passing through a plurality of optical filters may be respectively provided to a plurality of photodiodes having different spectroscopic characteristics or properties. Then, the plurality of photodiodes may convert the visible-light signals or filtered light into electric signals.

The data processing module 300 may be provided in the housing 100, and may receive the electric signals from the lens module 200 and may convert the electric signals into data. The data processing module 300 may be provided within the lower housing 120. The electric signals provided from the photo-electric conversion module 225 of the lens module 200 may be converted into data.

Figure 8:
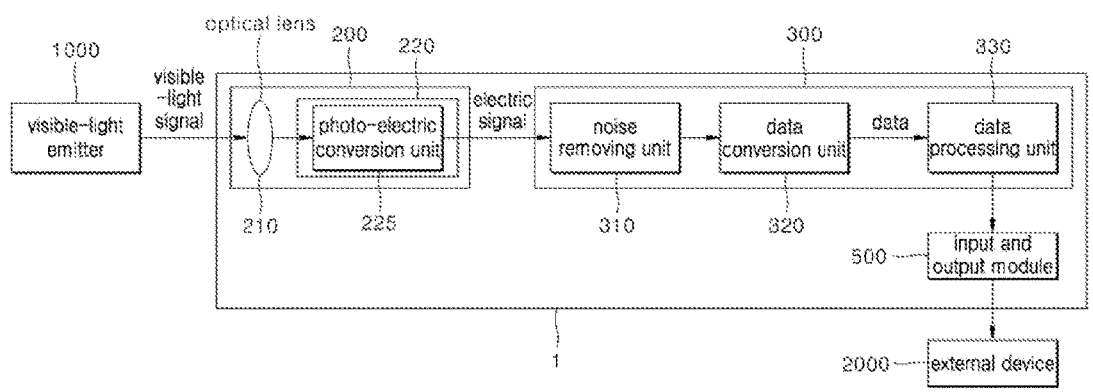
FIG. 8 is a block diagram illustrating a signal processing flow by the visible-light receiver of FIG. 1.

That is, as shown in FIG. 8, the data processing module 300 may include a noise removing unit or noise filter 310 that receives electric signals from the photo-electric conversion module 225 and removes noise from the electric signals, a data conversion unit or analog to digital converter 320 that converts signals, now free of noise, as received from the noise removing unit 310 into data, and a data processing unit or data processor 330 that receives and processes the data.

In an embodiment, the visible-light signal may include a low-frequency noise component generated from, for example, a fluorescent lamp or TV present in the environment of the visible-light receiver 1. Accordingly, the noise removing unit 310 may be configured as a filter having a pass frequency band higher than a frequency band of the noise component in order to filter the electric signal received from the photo-electric conversion module 225, that is, the modulated signal, to remove noise therefrom.

The noise removing unit 310 may include a high pass filter or a band pass filter. In an embodiment, the data conversion unit 320 may convert (that is, demodulate) the electric signal, i.e., the modulated signal, from which the noise has been removed, into data; or demodulate the modulated signal into data. The demodulated data may be provided to the data processing unit 330. The data processing unit 330 may receive and process the demodulated data from the data conversion unit 320 and, subsequently, the processed data may be provided to the input and output module 500.

The data processing module 300 may be fixed via the first and second fasteners 604 and 606 to the first and second bosses 124 and 126 of the lower housing 120. The lens module 200 may be placed on the top face of the data processing module 300. The input and output module 500 may be provided on or at a lateral face or a second face of the data processing module 300. Accordingly, the data converted from the data processing module 300 may be output to an external device 2000 via the input and output module 500.

In an embodiment, the data processing module 300 may be, for example, a printed circuit board (PCB). Such a printed circuit board may comprise one or more of application specific integrated circuits (ASICs), digital signal processors (DSPs), digital signal processing devices (DSPDs), programmable logic devices (PLDs), field programmable gate arrays (FPGAs), a controller, a microprocessor, and/or a memory, for example.

The cap 400 may be provided on the top face of the housing 100 so as to protrude upward and to vertically overlap with the first opening 112. A second opening 405 and a third opening 410 may be defined in bottom and top faces of the cap 400, respectively.

When a first visible-light signal from a first external visible-light emitter 1000 is intended to be or is successfully incident on the first opening 112, the cap 400 may block a second visible-light signal from being incident on the first opening 112. The second visible light signal from a second external visible-light emitter may not be intended to be incident on the first opening 112.

Figure 7:
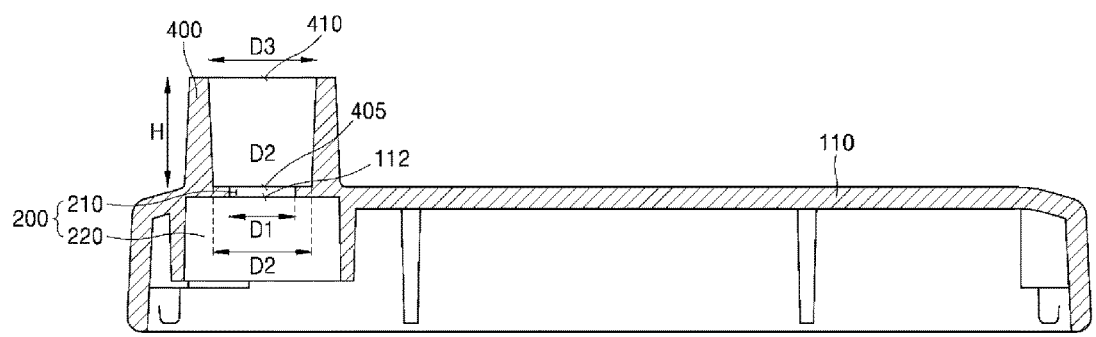
FIG. 7 is a partial cross-section view of the visible-light receiver of FIG. 1.

In order to block the visible-light signal, the cap 400 may have the structure shown in FIG. 7. A diameter D1 of the first opening 112 may be smaller than a diameter D2 of the second opening 405. The diameter D2 of the second opening 405 may be smaller than a diameter D3 of the third opening 410.

The diameter D2 of the second opening 405 and the diameter D3 of the third opening 410 may be equal to each other. For convenience of illustration, an example in which the diameter D2 of the second opening 405 is smaller than the diameter D3 of the third opening 410 may be exemplified.

Further, a height H of the cap 400 may include a first dimension. A difference in dimension between the diameter D3 of the third opening 410 and the diameter D1 of the first opening 112 may include a second dimension. Assuming that the diameter D3 of the third opening 410 includes a third dimension, the first dimension may be equal to the third dimension, and the first dimension may be 1.5 times or more than the second dimension. That is, a measurement of the height H of the cap 400 may be equal to a measurement of the diameter D3 of the third opening 410, and the height H of the cap 400 may be greater than or equal to 1.5 times a measurement of the diameter D3 of the third opening 410 less a measurement of the diameter D1 of the first opening 112.

In an embodiment, when each of the first dimension and the third dimension are 8 mm, the visible light receiver 1 may normally receive a visible-light signal without receiving errors or interference from a ceiling lamp (at, e.g., 13 m height from the floor) and an office illumination unit (at, e.g., 3 m height from the floor). In an embodiment, an inner circumferential face of the cap 400 may be made of a material that lowers the visible-light reflectance.

Surface treatment may be performed on the inner circumferential face of the cap 400 to lower the visible-light reflectance such that a second visible-light emitted from a second visible-light emitter (i.e., an illumination unit that emits a visible-light signal as non-targeted by the visible light receiver 1) may be less reflected on the inner circumferential face of the cap 400, thereby minimizing the incident amount of the light onto the lens module 200.

A color of the inner circumferential face of the cap 400 may be a color having a low reflectance of light (including infrared rays, ultraviolet rays, etc. other than visible-light). A surface roughness of the inner circumferential face of the cap 400 may have a low surface reflectivity. Accordingly, the amount of the visible-light which may be emitted from the second visible-light emitter, reflected from the inner circumferential face of the cap 400, and then entered into the lens module 200 may be minimized. Further, a visible-light signal reception error at the visible-light receiver 1 may be minimized.

In an embodiment, the cap 400 may be formed integrally with the housing 100, but the invention is not limited thereto. In another embodiment, the cap 400 may be configured separately from the housing 100, as exemplified in the drawings.

The input and output module 500 may be electrically connected to the data processing module 300 and may receive data from the data processing module 300 and output the data to the external device 2000. The input and output module 500 may be provided in a lateral face of the data processing module 300. A portion of the module 500 may protrude out of the housing 100 via the through-hole 113 while a remaining portion thereof may be located inside the housing 100.

That is, a portion of the input and output module 500 may be electrically connected to the external device 2000. The remaining portion of the module 500 may be electrically connected to the data processing module 300. Accordingly, the input and output module 500 may receive data from the data processing module 300 and/or the data processing unit 330, and output the data to the external device 2000. The input and output module 500 may also receive data from the external device 2000 and provide the data to the data processing module 300. In an embodiment, the input and output module 500 may include, but is not limited to, a USB (Universal Serial Bus), for example. Further, the input and output module 500 may include, but is not limited to, mini-USBs, micro-USBs, Type A USBs, Type B USBs, Type C USBs, Mini A USBs, Mini B USBs, Micro A USBs, Micro B USBs, Micro AB USBs, USB 2.0, USB 3.0, Apple Lightning interfaces, 30-pin interfaces, 8-pin interfaces, HDMIs, etc.

Figure 9:
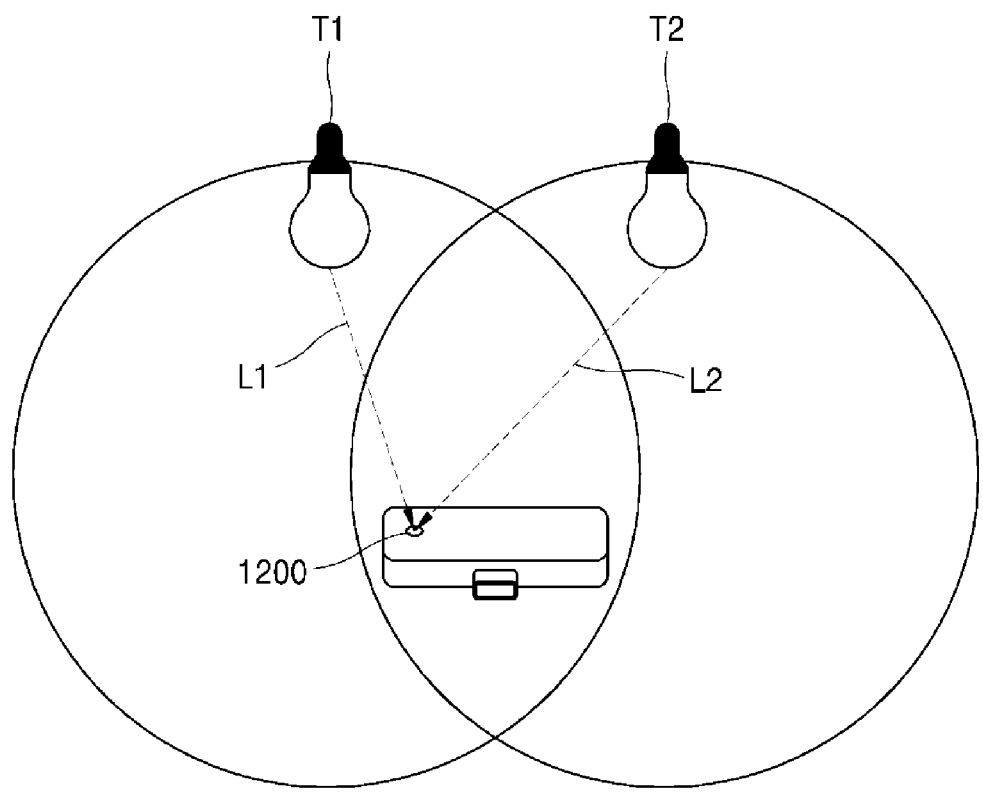
FIG. 9 is a schematic diagram illustrating visible-light signal reception by a conventional visible-light signal receiver.
Figure 10:
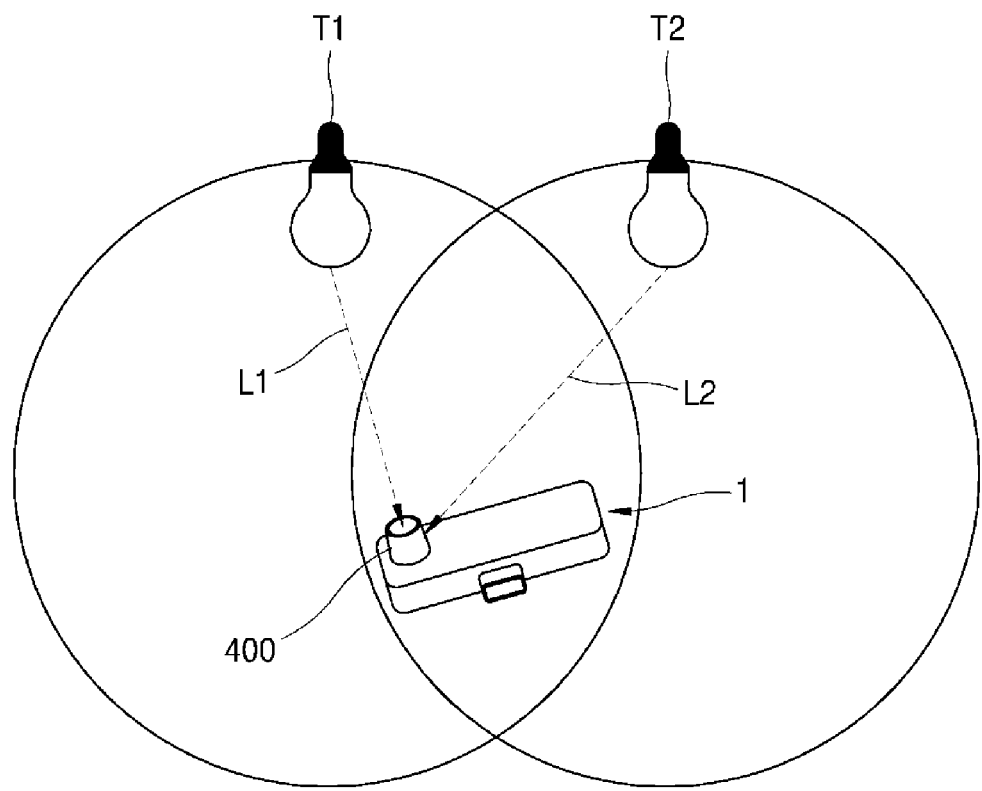
FIG. 10 is a schematic diagram illustrating visible-light signal reception by the visible-light receiver of FIG. 1.

Next, with reference to FIG. 9 and FIG. 10, visible-light signal reception by the visible-light receiver 1 according to an embodiment will be described. FIG. 9 is a schematic diagram illustrating receipt of a visible-light signal by a conventional visible-light signal receiver. FIG. 10 is a schematic diagram illustrating visible-light signal reception by the visible-light receiver of FIG. 1.

FIG. 9 shows a conventional visible-light signal receiver. The conventional visible-light receiver does not include the cap 400 in FIG. 1. Therefore, even when it is intended that the receiver 1 receive only a visible-light signal L1 from a first illumination unit or first illuminating device T1 through the lens module 1200, the receiver 1 may unintentionally receive a visible-light signal L2 from a second illumination unit or second illuminating device T2 through the lens module 1200.

In this case, the visible-light signal L1 from the first illumination unit T1 and the visible-light signal L2 from the second illumination unit T2 may act as noises to each other and/or interfere with each other, and thus the visible-light signal reception accuracy in the visible-light receiver 1 may be less accurate.

In contrast, the visible-light receiver 1 of FIG. 1 shown in FIG. 10 has the cap 400. When the receiver 1 receives the visible-light signal L1 from the first illumination unit T1, the visible-light signal L2 from the second illumination unit T2 may be blocked by the cap 400.

As described above, the visible-light receiver 1 according to an embodiment may reduce noise by blocking unnecessary visible-light signals using the cap 400. This may improve the visible-light signal reception accuracy. Further, the improvement of the visible-light signal reception accuracy may allow an accurate identification of each illumination unit even in an environment in which a plurality of illumination units is densely provided. This makes it possible to improve usability and extend the scope of application of the receiver device or the visible-light receiver.

Figure 11:
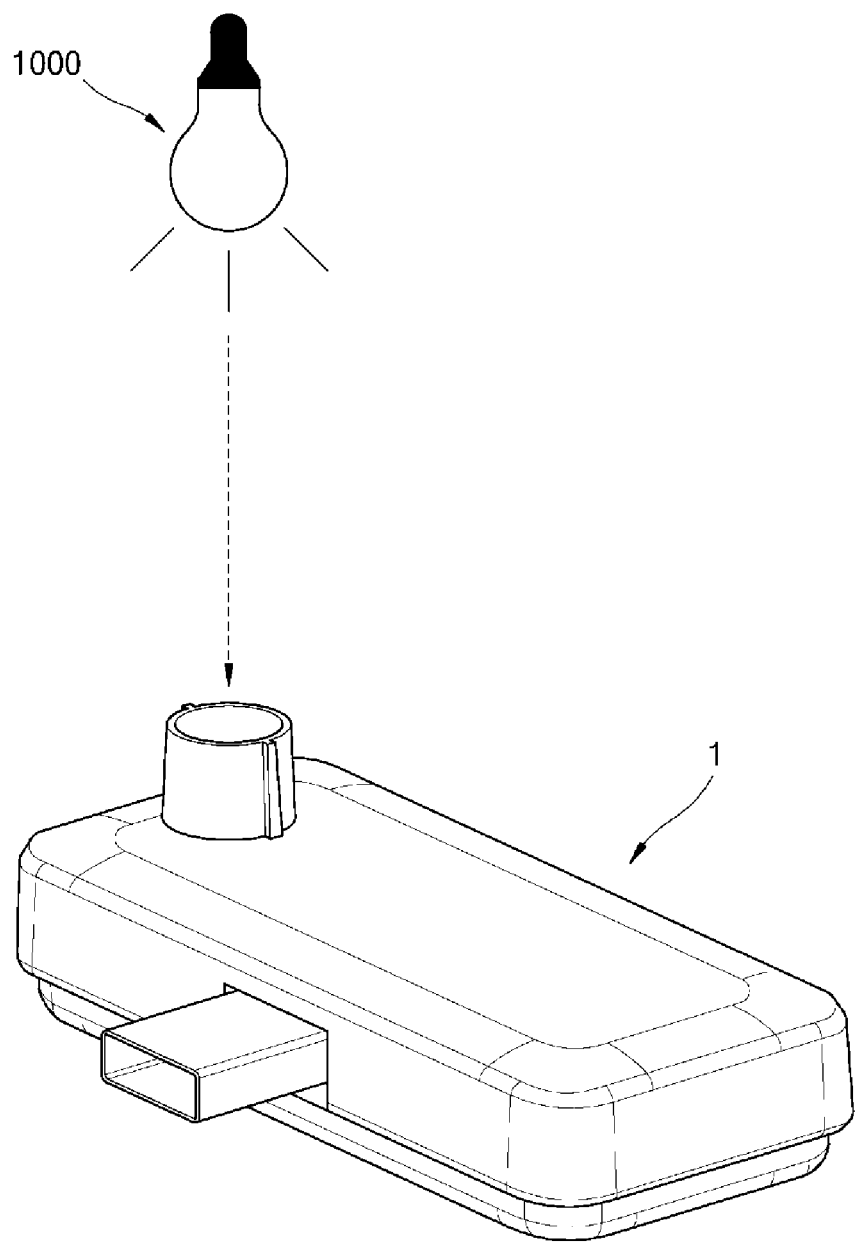
FIG. 11 is a schematic diagram illustrating a visible-light communication system in accordance with another embodiment.

Hereinafter, with reference to FIG. 11, a visible-light communication system 2 according to an embodiment will be exemplified. FIG. 11 is a schematic diagram illustrating a visible-light communication system according to an embodiment. However, for convenience of illustration, the overlapping contents between FIG. 1 and FIG. 10 are omitted.

Referring to FIG. 11, a visible-light communication system 2 according to an embodiment may include the visible-light emitter 1000 and the visible-light receiver 1. The visible-light emitter 1000 may be a device that emits a visible-light signal and may include a light-emitting element such as an LED (light emitting diode).

At least one light-emitting element may be provided. When a plurality of light-emitting elements is provided in the visible-light emitter 1000, the light beams as emitted by the light-emitting elements may contain different visible-light signals, respectively.

There may be a plurality of visible-light emitters 1000, or there may be a single visible-light emitter 1000 as exemplified in the drawings. In a former case, the visible-light emitters may emit different visible-light signals, respectively.

In an embodiment, the visible-light receiver 1 may be a device that receives a visible-light signal emitted by the visible-light emitter 1000, and may be the same device as the visible-light receiver as illustrated in FIGS. 1 to 10. As described above, the visible-light communication system 2 according to an embodiment may improve a visible-light communication efficiency by including therein the visible-light receiver 1. Further, the improvement of the visible-light communication efficiency may allow a unified network environment having a plurality of illumination units concentrated in one space thereof to identify each illumination unit therein.

Embodiments disclosed herein provide a visible-light receiver that may improve the visible-light signal reception accuracy by blocking unwanted visible-light signals. Embodiments disclosed herein provide a visible-light communication system that may improve the visible-light communication efficiency by including the above-described visible-light receiver therein.

Embodiments disclosed herein are not limited to the above-mentioned purposes. Other purposes and advantages of embodiments disclosed herein may be understood from the following descriptions and more clearly understood from the exemplary embodiments. Further, it will be readily appreciated that the objects and advantages of embodiments disclosed herein may be realized by features and combinations thereof as disclosed in the claims.

A visible-light receiver in accordance with embodiments disclosed herein may include a housing having a first opening defined on a top face thereof, and a cap provided on a top face of the housing so as to extend around the first opening and protrude upwardly. This configuration may prevent unwanted visible-light signals from entering the first opening. Further, a visible-light communication system according to embodiments disclosed herein may have improved visible-light communication efficiency by including the visible-light receiver as described above therein.

The visible-light receiver according to embodiments disclosed herein may reduce noise by blocking unnecessary visible-light signals using the cap. This may improve the visible-light signal reception accuracy. Further, the improvement of the visible-light signal reception accuracy may allow an accurate identification of each illumination unit even in an environment in which a plurality of illumination units is densely provided. This makes it possible to improve usability and extend the scope of application of the visible-light receiver.

Further, the visible-light communication system according to embodiments disclosed herein may improve the visible-light communication efficiency by including therein the visible-light receiver as described above. Further, the improvement of the visible-light communication efficiency may allow a unified network environment having a plurality of illumination units concentrated in one space thereof to identify each illumination unit therein.

Other specific effects of embodiments disclosed herein as well as the effects as described above will be described together with specific examples. The detailed advantageous effects according to embodiments disclosed herein as well as the aforementioned effects have been described above with regard to exemplary embodiments. Embodiments described above may be variously substituted, altered, and modified by those skilled in the art to which the present disclosure pertains without departing from the scope and sprit of the present disclosure. Therefore, embodiments disclosed herein are not limited to the above-mentioned exemplary embodiments and the accompanying drawings.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A receiver that processes light into electrical data, including:
   a housing having a first opening defined on a first surface thereof;
   a lens module provided inside the housing to convert light received through the first opening into an electrical signal via a photoelectric converter;
   a data processor assembly provided within the housing that receives the electrical signal from the lens module and converts the electric signal into data;
   an input/output module electrically connected to the data processor assembly, wherein the input/output module receives the data from the data processor assembly and outputs the data to be transferred; and
   a cap provided on the first surface of the housing protruding upward from the housing and extending around the first opening, wherein the cap includes:
      a second opening provided in a lower portion of the cap, wherein a diameter of the first opening is smaller than a diameter of the second opening;
      a third opening provided in an upper portion of the cap, wherein the diameter of the second opening is smaller than a diameter of the third opening, and a height of the cap is at least equal to the diameter of the third opening, or at least 1.5 times larger than a difference between the diameter of the third opening and the diameter of the first opening, and
      an inner circumferential face of the cap that lowers a light reflectance.

2. The receiver of claim 1, wherein when light emitted by a first source is incident onto the first opening, the cap prevents other light emitted by a different source being incident onto or passing through the first opening.

3. The receiver of claim 1, wherein a portion of the input/output module is provided in a through-hole defined in a second surface of the housing such that the input/output module partially protrudes outside of the housing, and a remaining portion of the input/output module is located inside the housing.

4. The receiver of claim 1, wherein the housing includes:
   a first housing having the first opening defined in a first surface of the first housing and a through-hole defined in a second surface of the first housing; and
   a second housing coupled to the first housing.

5. The receiver of claim 4, wherein the data processor assembly is provided in the second housing, the lens module is provided on a first surface of the data processor assembly, the input/output module is provided on a second surface of the data processor assembly, and a portion of the input/output module is provided in the through-hole such that the input/output module partially protrudes out of the first housing.

6. The receiver of claim 1, wherein the lens module includes:
   an optical lens that receives light received through the first opening, and focuses the received light; wherein the photoelectric converter receives the focused light from the optical lens and converts the focused light into an electrical signal.

7. The receiver of claim 6, wherein the photoelectric converter includes at least one photodiode.

8. The receiver of claim 6, wherein the data processor assembly includes:
   a filter that receives the electrical signal from the photoelectric converter and removes noise from the electrical signal;
   an analog to digital converter that receives the filtered electrical signal from the filter and converts the filtered electrical signal to the data; and
   a data processor that processes the data.

9. A visible-light communication system including:
   an emitter that emits light of a prescribed wavelength;
   a receiver that receives the emitted light,
   wherein the receiver includes:
      a housing having a first opening defined in a first surface of the housing;
      a lens module provided inside the housing that receives the emitted light and converts the emitted light into an electrical signal via a photoelectric converter, wherein the emitted light is passed through the first opening to the lens module;
      a data processor assembly provided within the housing that receives the electrical signal from the lens and converts the electrical signal into data;
      an input/output module electrically connected to the data processor assembly, wherein the input/output module receives the data from the data processor assembly and outputs the data to an external device; and
      an open-ended cap provided on the first surface of the housing extending around the first opening and protruding upward from the housing, wherein the open-ended cap prevents light emitted from a second visible-light emitter or other visible-light emitters from passing through the first opening and includes:
         a second opening provided in a lower portion of the open-ended cap;
         a third opening provided in an upper portion of the open-ended cap, wherein a diameter of the first opening is smaller than a diameter of the second opening, the diameter of the second opening is smaller than a diameter of the third opening, and a height of the open-ended cap is at least equal to the diameter of the third opening or is at least 1.5 times larger than a difference between the diameter of the third opening and the diameter of the first opening; and
         an inner circumferential face of the open-ended cap that lowers a visible-light reflectance.

10. The visible-light communication system of claim 9, wherein the emitter includes a light-emitting element, and light emitted from the light-emitting element includes a visible-light signal of light in the visible spectrum of electromagnetic radiation.

11. A communication system including:
- a first emitter that emits a first light of a first prescribed wavelength range;
- a second emitter that emits a second light of a second prescribed wavelength range;
- a receiver positioned between the first and second emitter, wherein the receiver includes:
  - a housing having a first opening on a first surface extending in a first direction;
  - a lens provided inside the housing; and
  - a hollow tube provided over the first opening and extending in a second direction different from the first direction, the hollow tube having an inner diameter which decreases toward the first opening;
  - a photoelectric converter to convert one of the first light and the second light received through the first opening into an electrical signal; and
  - a data processor assembly to process the electrical signal.

12. The communication system of claim 11, wherein the hollow tube interferes with the second light from passing through the first opening to the lens while the first light is allowed to pass through the first opening.

13. The communication system of claim 11, wherein the first opening has a diameter that is less than a minimum inner diameter of the hollow tube, and the lens has a diameter at least equal to the diameter of the first opening.

14. The communication system of claim 11, wherein a height of the hollow tube is equal to or greater than a maximum inner diameter of the hollow tube.

15. The communication system of claim 11, wherein a height of the hollow tube is equal to or greater than 1.5 times a difference between a maximum inner diameter of the hollow tube and a minimum inner diameter of the hollow tube.

16. The communication system of claim 11, wherein the first light and the second light include electromagnetic radiation having a wavelength in the visible light spectrum.

17. The communication system of claim 11, further including:
- an input/output module; and
- an external device coupled to the input/output module, wherein the photoelectric converter converts the first light received through the first opening into an electrical signal, the data processor assembly converts the electrical signal into data, and the input/output module transfers the data to the external device.

18. The communication system of claim 11, further including at least one optical filter between the lens and the photoelectric converter that filters out predetermined wavelengths of light outside of the first prescribed wavelength range, and at least one photodiode having predetermined spectral or spectroscopic properties, wherein the first light that has filtered through the at least one optical filter is provided to the at least one photodiode such that the first light is converted into at least one electrical signal, which is converted into data by the data processor assembly.

19. The communication system of claim 11, wherein the data processor assembly includes:
- a filter to remove noise from the electrical signal,
- an analog-digital converter to convert the filtered electrical signal to digital data after noise has been removed, and
- a data processor that processes the digital data for output to the input/output module.

20. The receiver of claim 1, wherein the input/output module includes one of a Universal Serial Bus (USB), a mini-USB, a micro-USB, a Type A USB, a Type B USB, a Type C USB, a Mini A USB, a Mini B USB, a Micro A USB, a Micro B USB, a Micro AB USB, a USB 2.0, a USB 3.0, an Apple Lightning interface, a 30-pin interface, an 8-pin interface, and an HDMI.

* * * * *